United States Patent
Fu

(10) Patent No.: US 6,834,182 B2
(45) Date of Patent: Dec. 21, 2004

(54) METHOD AND APPARATUS PROVIDING REAL-TIME ADJACENT CHANNEL POWER RATIO (ACPR) IN A MOBILE STATION

(75) Inventor: Taoling Fu, San Diego, CA (US)

(73) Assignee: Nokia Corporation, Espoo (FI)

(*) Notice: Subject to any disclaimer, the term of this patent is extended or adjusted under 35 U.S.C. 154(b) by 459 days.

(21) Appl. No.: 09/774,788

(22) Filed: Jan. 31, 2001

(65) Prior Publication Data

US 2004/0198232 A1 Oct. 7, 2004

(51) Int. Cl.[7] ............................................. H04B 17/00
(52) U.S. Cl. ..................... 455/115.1; 455/116; 455/126; 330/129
(58) Field of Search .................... 455/115.1–115.4, 455/116, 126, 127.1–127.2, 127.5; 330/129, 75, 85, 96, 97, 278, 285; 375/295, 312

(56) References Cited

U.S. PATENT DOCUMENTS

| | | | |
|---|---|---|---|
| 5,524,285 A | 6/1996 | Wray et al. .................. | 455/126 |
| 5,625,322 A | 4/1997 | Gourgue et al. ............ | 330/129 |
| 6,275,103 B1 | 8/2001 | Maniwa ....................... | 330/149 |
| 6,438,360 B1 * | 8/2002 | Alberth et al. .............. | 455/110 |

FOREIGN PATENT DOCUMENTS

| | | |
|---|---|---|
| JP | 2000-78037 A | 3/2000 |
| WO | WO-99/45637 A1 | 9/1999 |

OTHER PUBLICATIONS

How–Siang Yap, Designing to Digital Wireless Specifications Using Circuit Envelop Simulation, IEEE, 1997 Asia–Pacific, Volume: Dec. 2–5, 1997, pp. 173–176 vol. 1.* 06005326*

* cited by examiner

Primary Examiner—Lee Nguyen
(74) Attorney, Agent, or Firm—Harrington & Smith, LLP

(57) ABSTRACT

A method for operating a mobile station includes steps of (A) operating an RF transmitter power detector to obtain an output signal that is indicative of a magnitude of RF power transmitted by the mobile station; (B) processing the output signal to determine a time-varying characteristic of the output signal; and (C) determining a value of the Adjacent Channel Power Ratio (ACPR) from the time-varying characteristic. A further step uses the determined value of the ACPR to control a DC bias current, and therefore the output power capability, of a transmitter amplifier.

8 Claims, 6 Drawing Sheets

METHOD AND APPARATUS PROVIDING REAL-TIME ADJACENT CHANNEL POWER RATIO (ACPR) IN A MOBILE STATION

FIELD OF THE INVENTION

This invention relates generally to radiotelephones, such as digital cellular telephones, also referred to herein as mobile stations, and relates more particularly to mobile station RF transmitter circuitry.

BACKGROUND OF THE INVENTION

One major parameter of the transmitter of a mobile station (MS) is the Adjacent Channel Power Ratio (ACPR). It is related to the nonlinearity of the transmitter circuits, such as the power amplifier (PA), and it basically defines the maximum output power of the MS. In order to meet the maximum output power specification conventional practice designs the transmitter with a substantial margin in the ACPR at any output power level. The desired goal is for the transmitter to always meet the ACPR requirement at any power level despite component, temperature, battery voltage and other variations.

However, this is not an optimum technique with which to design a transmitter, as the additional safety margin results in an increase in DC current consumption. For battery powered devices any increase in DC current consumption is undesirable, as it reduces the amount of time between required rechargings of the battery. For a cellular telephone, this can translate into a reduction in both talk time and standby time.

Ideally, the transmitter's bias current should be variable such that only a minimum DC current is consumed to produce a transmitted signal that just meets the ACPR specification at any given output power. Such a transmitter would require a mechanism that is simple enough to incorporate within the MS, and that would also be capable of measuring the ACPR quickly and continuously. Prior to this invention, such a mechanism was not known.

In greater detail, and referring to FIG. 3, the ACPR is defined as the dB difference between a signal's main power (P0) and its "adjacent channel" power (P1) at a certain frequency offset from the signal's center frequency. Let ACPRsig be the ACPR of the signal, $$\text{ACPR sig} = P1 - P0. \qquad (1)$$

ACPRsig will decrease as P0 increases. This is how ACPR determines the output power P0. For IS-95 and similar Code Division Multiple Access (CDMA) systems, the main desired channel power is located within a 1.23 MHz band around the channel center frequency. The adjacent channel has a bandwidth of 30 KHz and is offset by 900 KHz from the center frequency of the desired channel. The typical measurement of P0 and P1 is by the use of spectrum analyzer in the laboratory. Generally, such a measurement method is difficult, if not impossible, to implement in the MS.

Referring to FIG. 4, a diode power detector 20B is a common feature in the MS transmitter, and is used for power control purposes when operating in either the digital mode or the analog mode (e.g., the AMPS mode). The input to the diode power detector circuit 20B, obtained from a directional coupler 21, is normally situated at the output of the RF PA 20' (the output going typically to a duplexer 20A). In a manner similar to that of an envelope detector in a conventional AM receiver, the power detector circuit 20B outputs a DC voltage that tracks the envelope of the RF signal. V_DC applied through R2 represents a forward bias potential for the power detector diode, and C1 and R1 are a part of the envelope detector. The RF signal is coupled to the anode of the power detector diode through a coupling capacitor (C2).

Before the power detector circuit 20B can be used to monitor the RMS power of the MS transmitter, it needs to be calibrated to establish the relation between its output voltage and the average power of CDMA signal to be detected. This is typically done in the factory when the MS is tuned.

When the detector is used to monitor the output power of the PA 20, only the DC component of its output is used. However, the time-varying envelope of the CDMA signal also contributes AC components to the output of the power detector circuit 20B. In conventional practice these AC components are considered undesirable for power monitoring purposes, and heavy lowpass filtering is generally used to remove these undesirable AC components.

OBJECTS AND ADVANTAGES OF THE INVENTION

It is a first object and advantage of the use of this invention to provide a technique to calculate the ACPR in real-time in the mobile station, and to use the results of the calculation to reduce the DC power consumption of the mobile station.

It is a further object and advantage of this invention to make use of the undesirable AC components in the output of the transmitter power detector circuit for making ACPR measurements.

SUMMARY OF THE INVENTION

The foregoing and other problems are overcome and the foregoing objects and advantages are realized by methods and apparatus in accordance with embodiments of this invention.

The teachings of this invention provide measurement embodiments that fulfill the need to measure the ACPR with circuitry that can be incorporated into a mobile station. One important aspect of these teachings is that they enable the use of power detector circuitry that is already found in the mobile station transmitter circuitry, enabling the measurement of the ACPR by analyzing the output signal from the power detector, using an already present Digital Signal Processor (DSP), without incurring any incremental cost or circuit complexity.

A method is disclosed for operating a mobile station. The method includes steps of (A) operating an RF transmitter power detector to obtain an output signal that is indicative of a magnitude of RF power transmitted by the mobile station; (B) processing the output signal to determine a time-varying characteristic of the output signal; and (C) determining a value of the Adjacent Channel Power Ratio (ACPR) from the time-varying characteristic. A further step uses the determined value of the ACPR to control a DC bias current, and therefore the output power capability, of a transmitter amplifier.

In one embodiment the time varying characteristic of the output signal includes a frequency spectrum. In this embodiment the step of processing makes a comparison of the power in one portion of the frequency spectrum corresponding to a desired channel frequency to the power in another portion of the spectrum corresponding to an adjacent channel frequency. The step of processing includes a step of obtaining a Fourier transform of the output signal, or otherwise filtering the output signal, and integrating the result.

In another embodiment the time varying characteristic includes output power excursions from an average power level, and the step of processing obtains a ratio of the magnitude of peak power level excursions to the average power level during an interval of time.

In a related embodiment the output power excursions include positive and negative output power excursions from the average power level, and the step of processing obtains a ratio of the magnitude of the positive power level excursions to a magnitude of the negative power excursions during an interval of time.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
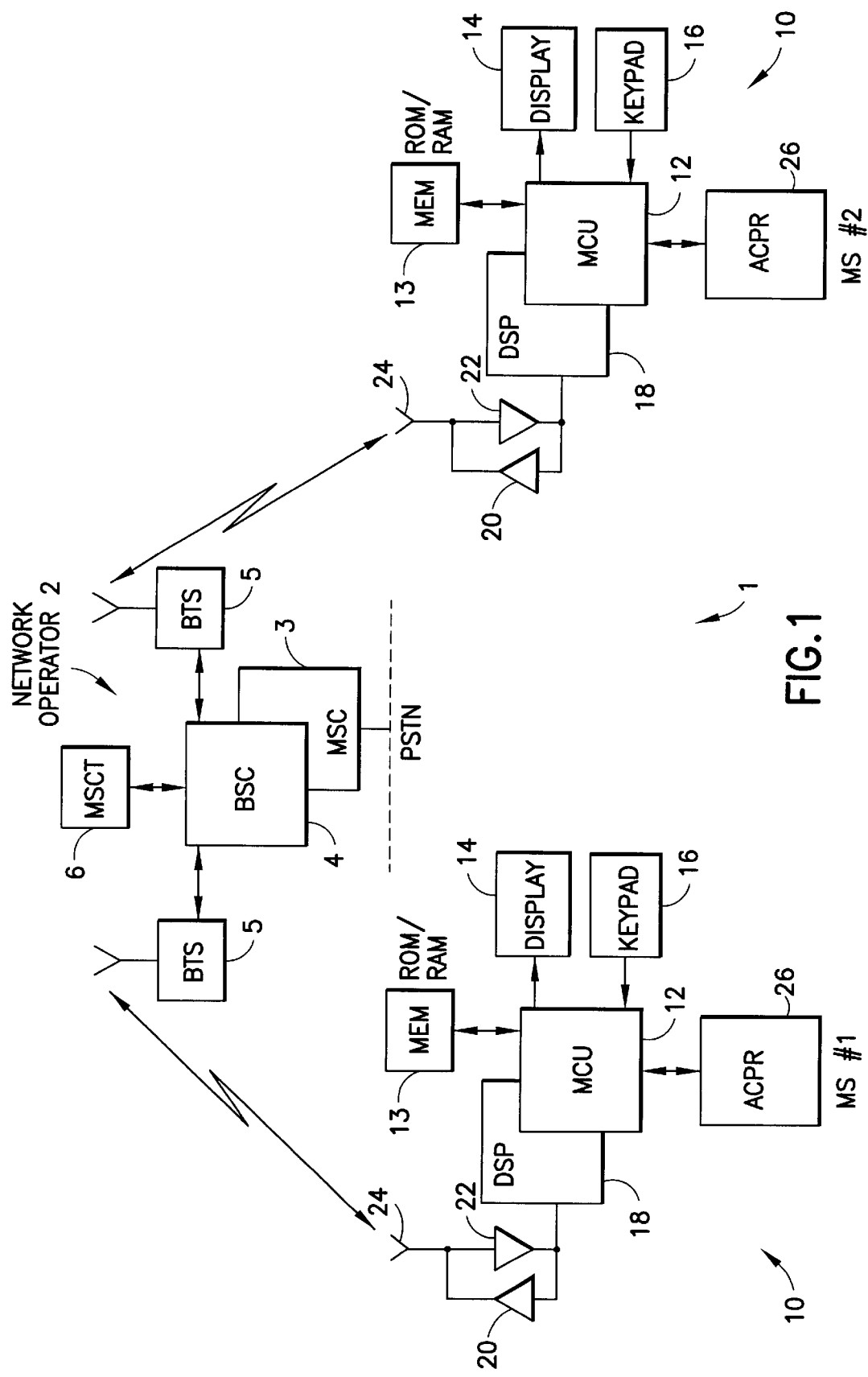
FIG. 1 is an overall block diagram of a wireless communication system that is suitable for practicing the teachings of this invention.

Before describing the teachings of this invention in detail, and referring to FIG. 1, a brief description will first be made of an exemplary wireless telecommunications system 1 wherein the teachings of this invention can be used to advantage. The wireless telecommunications system 1 includes a plurality of mobile stations 10. Two mobile stations (MSs) are shown in the Figure, with one being designated MS#1 and the other MS#2. FIG. 1 also shows an exemplary network operator 2 having, for example, a mobile switching center (MSC) 3 for connecting to a telecommunications network, such as the Public Switched Telephone Network or PSTN, at least one base station controller (BSC) 4, and a plurality of base transceiver stations (BTS) 5 (or simply base stations) that transmit in a forward or downlink direction both physical and logical channels to the mobile stations 10 in accordance with a predetermined air interface standard. It is assumed that a reverse or uplink communication path exists from the mobile station 10 to the network operator, which conveys mobile originated access requests and traffic, including voice and possibly packet data traffic.

In the presently preferred, but not limiting, embodiment of these teachings, the air interface standard conforms to a Code Division Multiple Access (CDMA) air interface based on or similar to TIA/EIA standard IS-95. The teachings of this invention are not, however, intended to be construed as being limited to use only in a CDMA network, as by example certain TDMA and FDMA and other types of wireless networks may also benefit from these teachings.

The network operator 2 can include Message Service Center (MSCT) 6 that receives and forwards messages for the mobile stations 10, such as Short Message Service (SMS) messages, or any wireless messaging technique including e-mail and Supplementary Data Services. Furthermore, enhancements to SMS can be used, such as one under development and known as Multimedia Messaging Service (MMS), wherein image messages, video messages, audio messages, text messages, executables and the like, and combinations thereof, can be transferred between a network and a mobile station.

The mobile station 10 typically includes a microcontrol unit (MCU) 12 having an output coupled to an input of a display 14 and an input coupled to an output of a keyboard or keypad 16. The mobile station 10 may be considered to be a handheld radiotelephone, such as a cellular telephone or a personal communicator, and may have a microphone and a speaker (not shown) for conducting voice communications. The mobile station 10 could also be contained within a card or module that is connected during use to another device. For example, the mobile station 10 could be contained within a PCMCIA or similar type of card or module that is installed during use within a portable data processor, such as a laptop or notebook computer, or even a computer that is wearable by the user.

The MCU 12 is assumed to include or be coupled to some type of a memory 13, including a read-only memory (ROM) for storing an operating program, as well as a random access memory (RAM) for temporarily storing required data, scratchpad memory, received data packets and data packets prepared for transmission, etc. A separate, removable SIM (not shown) can be provided as well, the SIM storing, for example, a preferred Public Land Mobile Network (PLMN) list and other subscriber-related information.

The mobile station 10 also contains a wireless section that includes a digital signal processor (DSP) 18, or equivalent high speed processor, as well as a wireless transceiver comprised of a transmitter 20 and a receiver 22, both of which are coupled to an antenna 24 for communication with the network operator 1.

The ROM is assumed, for the purposes of this invention, to store a program enabling at least the DSP 18 to execute the software routines required to implement the improved ACPR method in accordance with the teachings of this invention, as will now be described in further detail. To this end the MS 10 also includes an ACPR calculation and utilization block indicated generally as 26. As will be made apparent, the functionality of the block 26 is preferably implemented by software routines executed by the DSP 18.

Figure 2:
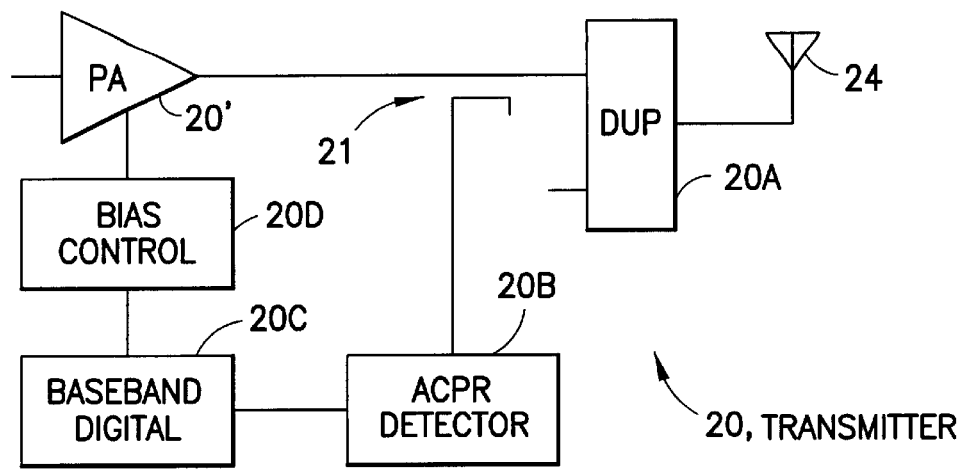
FIG. 2 is a block diagram of mobile station transmitter circuitry that depicts ACPR transmitter bias control in accordance with these teachings.
Figure 3:
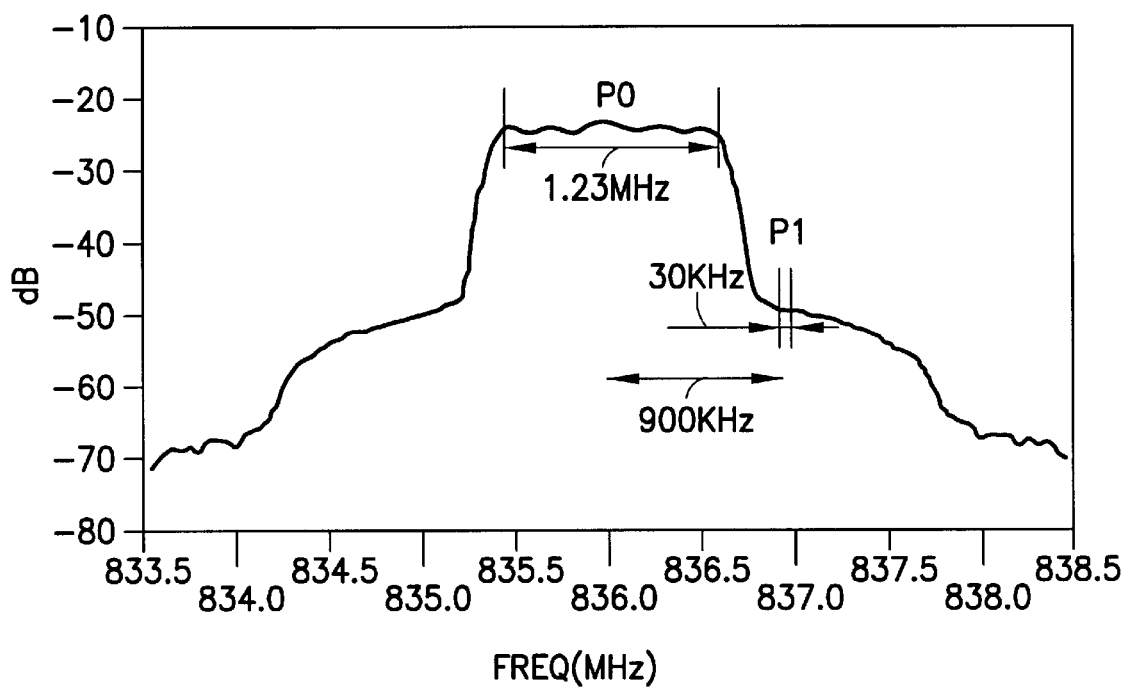
FIG. 3 is a plot of the transmitted power spectrum versus frequency and illustrates a conventional definition of the ACPR.
Figure 4:
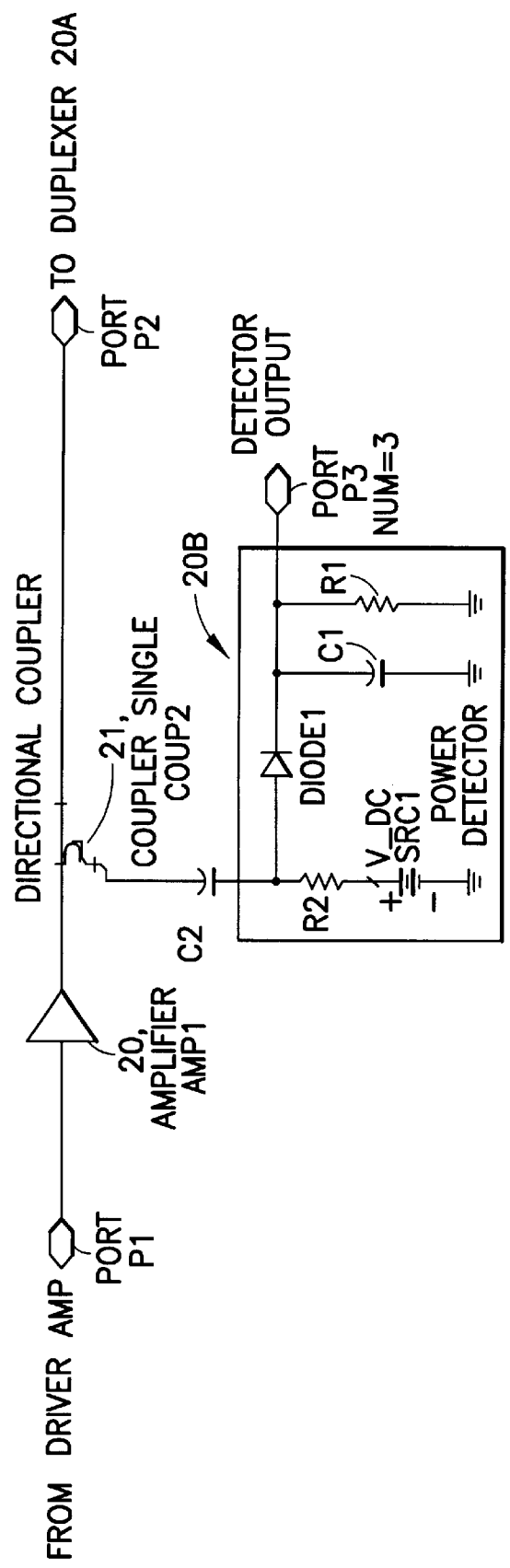
FIG. 4 is a schematic diagram of a conventional RF transmitter power detector circuit.

FIG. 2 shows a portion of the transmitter 20 circuitry that is most germane to an understanding of this invention. The transmitter 20 is constructed to include a power amplifier (PA) 20'. The output of the PA 20' feeds the antenna 24 via a conventional duplexer 20A. The output of the PA 20' is sensed by a directional power coupler 21 and fed to an input of a diode power detector (a suitable example of which is shown in FIG. 4), which may also be referred to for the purposes of this invention as an ACPR detector 20B. The diode power (ACPR) detector 20B may be constructed in a manner similar to that shown in FIG. 4. The output of the ACPR detector feeds an input of a baseband digital processing block 20C, which can be implemented in whole or in part by code running on the DSP 18. The output of the baseband digital processing block 20C in input to a transmitter bias control block 20D that generates a suitable bias signal for the PA 20'. In the preferred embodiment the bias potential is generated so as to bias the PA 20' such that it provides just enough output power capability to meet the ACPR requirement for the given output power, but without requiring the large power-wasting margin that was required to be engineered into prior art transmitter circuits, as was described previously.

In accordance with the teachings of this invention, a time-varying characteristic of the output of the diode power detector (FIG. 4) is processed in real-time, preferably by the DSP 18, to determine the value of ACPRsig, which is then employed for setting the bias signal for the PA 20' to thereby control the transmitter output power accordingly.

Figure 5:
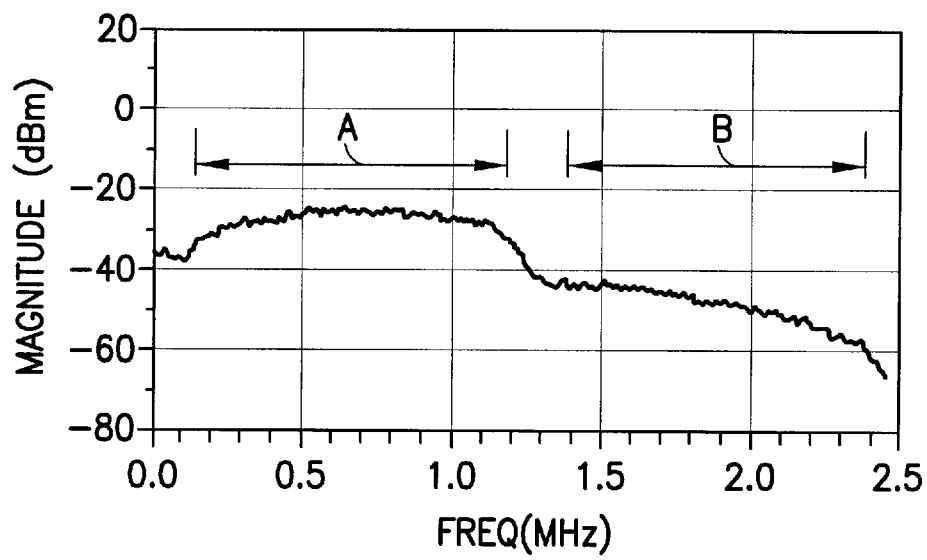
FIG. 5 illustrates the frequency spectrum of the output of the power detector circuit of FIG. 4.

First described is a presently preferred power detector output filtering method. This method measures the ACPR by analyzing the output of the ACPR detector 20B in the frequency domain. FIG. 5 shows the spectrum of the output of the ACPR detector 20B corresponding to an input CDMA signal (i.e., one being transmitted by the PA 20' to the BTS 5 of FIG. 1). Note that the DC component is used for transmitter output power monitoring, and thus represents the channel power P0 in Equation (1).

It can furthermore be shown that the integrated power from about 1.4 MHz to about 2.4 MHz is related to the adjacent channel power P. This important observation by the inventor is thus employed to measure in real-time the ACPR of the MS 10, as described in further detail below.

The baseband representation of the CDMA signal is $$S(t)=I(t)+jQ(t) \quad (2)$$

where $I(t)$ and $Q(t)$ are in-phase and quadrature-phase signals, respectively. The envelope of $S(t)$ is given by $$E=sqrt(I^2+Q^2) \quad (3)$$

Figure 6:
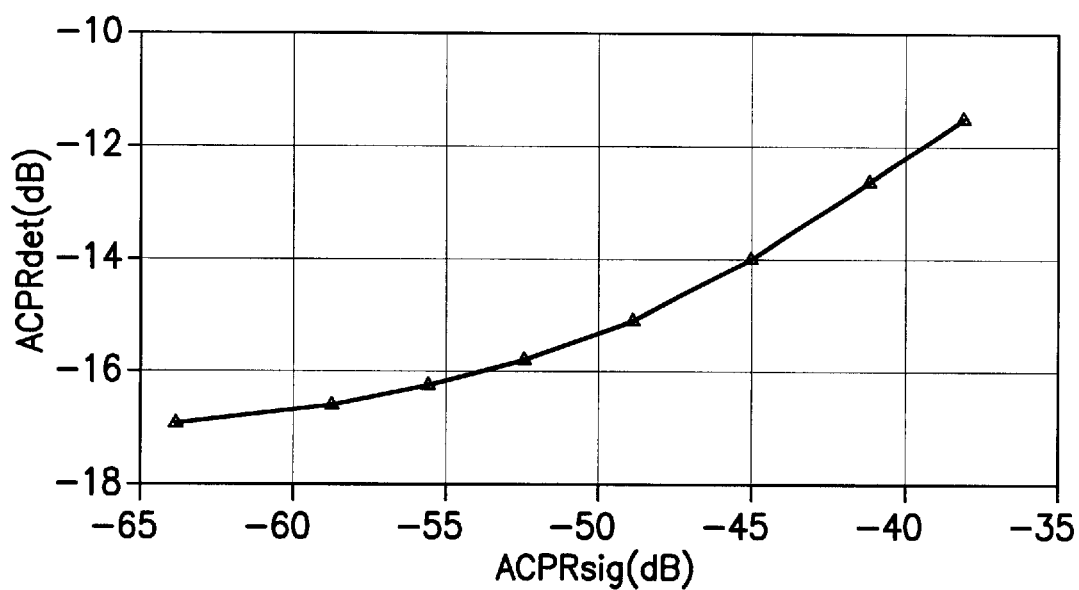
FIG. 6 is a result of a simulation and depicts the relation between ACPRdet and ACPRsig in a first embodiment.

Therefore, the spectrum of power detector is similar to that of $I^2$. Assuming that $l(f)$ is the Fourier transform of I, the Fourier transform of E is the convolution of l with itself. Convolution is a shift-multiply-integrate operation, and different parts of the spectrum in FIG. 4 can thus be accounted for. The first "hump" between 200 KHz and 1.2 MHz, designated as portion "A", is due to the channel power. The sloping "shoulder" between 1.4 MHz and 2.4 MHz, designated as portion "B", is due to the product of the channel power and the adjacent channel power. Let ACPRdet be the dB difference between the DC component and the integrated power from 1.4 MHz to 2.4 MHz. The relation between ACPRdet and ACPRsig is as shown in FIG. 6.

Figure 7:
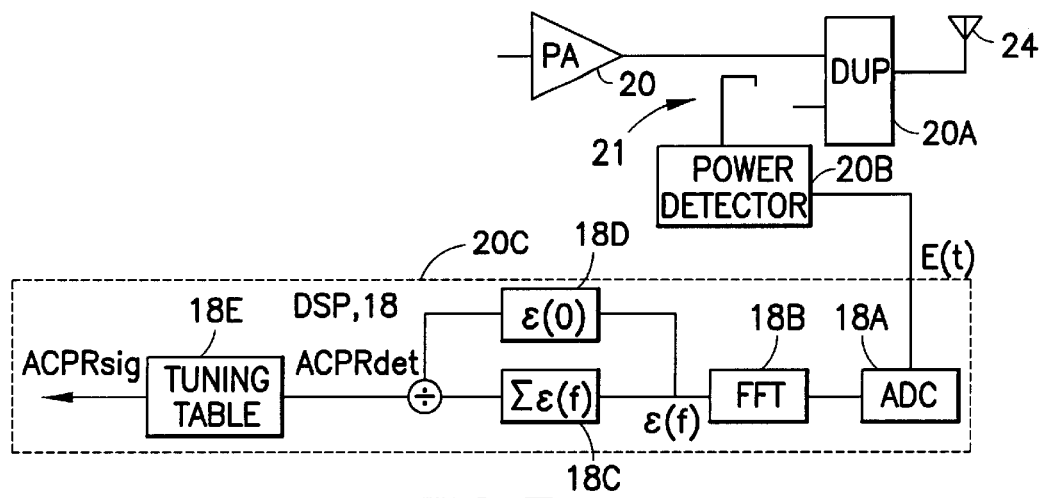
FIG. 7 is a logical block diagram of a first embodiment of an ACPRsig generation circuit in accordance with these teachings.

This technique for determining the ACPR can be implemented in the MS 10 in various ways. Ideally the frequency-domain analysis of the output E(t) of the ACPR detector 20B that is performed by the baseband digital module 20C is actually performed in the DSP 18, as is shown in FIG. 7. E(t) that is output from the power detector (ACPR detector) 20B is sampled by an analog to digital converter (ADC) 18A, windowed, and then subjected to a FFT operation in block 18B. In practice, the FFT block 18B can be replaced by any other suitable type of digital filter. The goal is to extract the power spectrum from the 1.4 MHz to 2.4 MHz component of the power detector 20B output E(t). Modifications can be made to alleviate the requirements made on the ADC 18A due to the dynamic range of E(t). Block 18C represents the integration of the power from about 1.4 MHz to about 2.4 MHz, while block 18D represents the extraction of the DC component of E(t). $\epsilon(f)$ is the FFT of E(t), so $\epsilon(0)$ is the DC component of E(t). Since the DC component is a function of the output power, the output of block 18D is indicative of PO in the ACPR definition. After division, the result is the value of ACPRdet which is applied to a tuning table 18E to look-up a corresponding value of ACPRsig. The tuning table 18E is similar to the graph of FIG. 6. The contents of the tuning table 18E are derived from an on-line factory calibration. The equipment at the tuning station of the production line measures the actual ACPR of the signal from the transmitter 20 and records the corresponding ACPRdet from the DSP 18. This process is repeated at different output power levels, i.e., at different ACPR, in order to establish the tuning table 18E. ACPRsig is applied to the bias control block 20D (FIG. 2) which generates the bias signals for PA 20', thereby setting the DC bias current of PA 20' to a more optimum, more DC power efficient value than that obtained by conventional power setting approaches.

Figure 8:
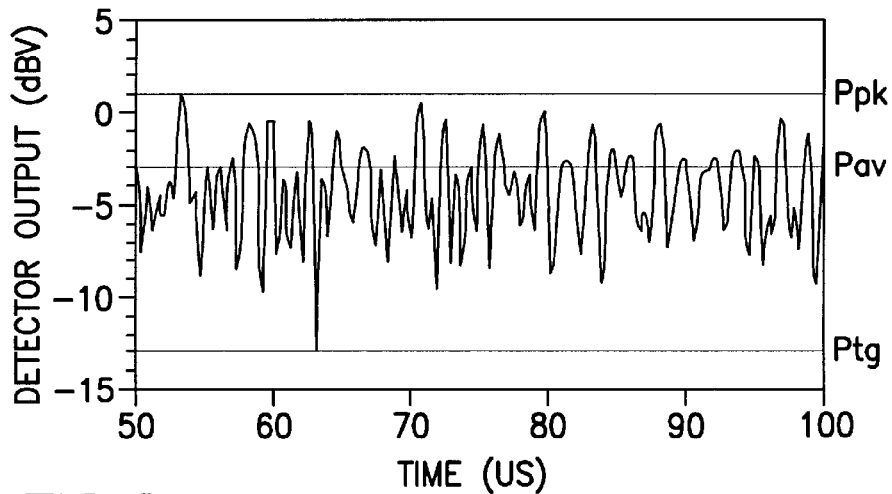
FIG. 8 is a time domain waveform diagram showing excursions in the power detector output signal E(t) for a typical transmitted CDMA signal, and is useful for explaining the operation of the second and third embodiments of these teachings.

Another embodiment, referred to as a Min-Max method, will now be described. FIG. 8 depicts an example of the time waveform of the output of the power detector 20B for an ideal CDMA signal. The magnitude of the power detector 20B output is proportional to the envelope of the CDMA signal. The CDMA signal has a certain Peak-to-Average ratio (PAR). When the transmitter 20 is operating near to its compression point, the peaks of the envelope are "flattened" by the nonlinearity. The result is a reduction in PAR in the time domain, or an increase in the ACPR in the frequency domain. Since the power detector 20B output E(t) is related to CDMA signal's envelope, the CDMA signal's PAR, and thus ACPR, can be estimated by analyzing E(t).

Figure 9:
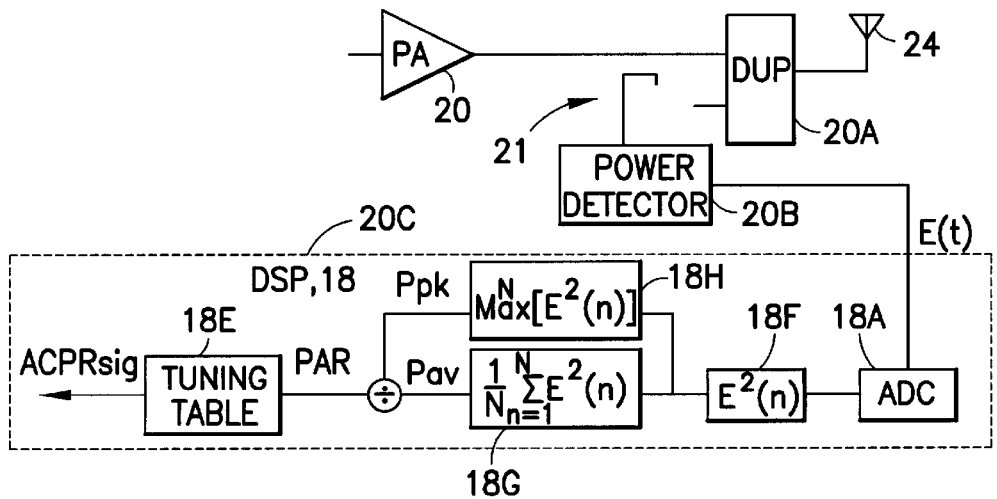
FIG. 9 is a logical block diagram of the second embodiment of the ACPRsig generation circuit in accordance with these teachings.

The Min-Max method is illustrated in the logical block diagram of FIG. 9 where, preferably, the processing is carried out by the DSP 18. Block 18F squares E(t), and block 18G the generates the time average of the square of N samples of E(t) to give an estimate of the average power Pav. Block 18H operates to determine the maximum of the N samples during the same time period, and thus provides an indication of the magnitude of the peak power Ppk, enabling the PAR can be calculated. The true RMS power Pav is a side benefit of this approach, as it is valuable for power control, although it increases the processing burden of DSP 18.

Figure 10:
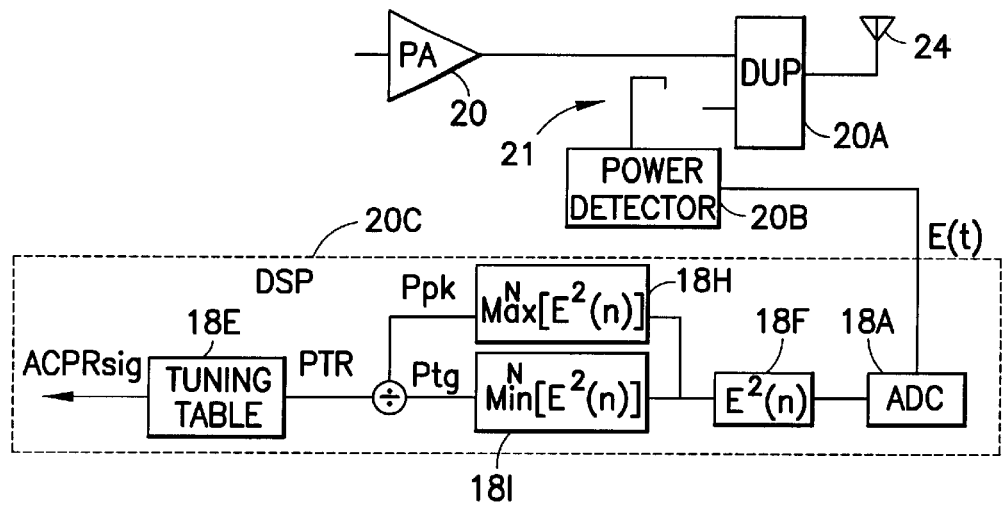
FIG. 10 is a logical block diagram of the third embodiment of the ACPRsig generation circuit in accordance with these teachings.
Figure 11:
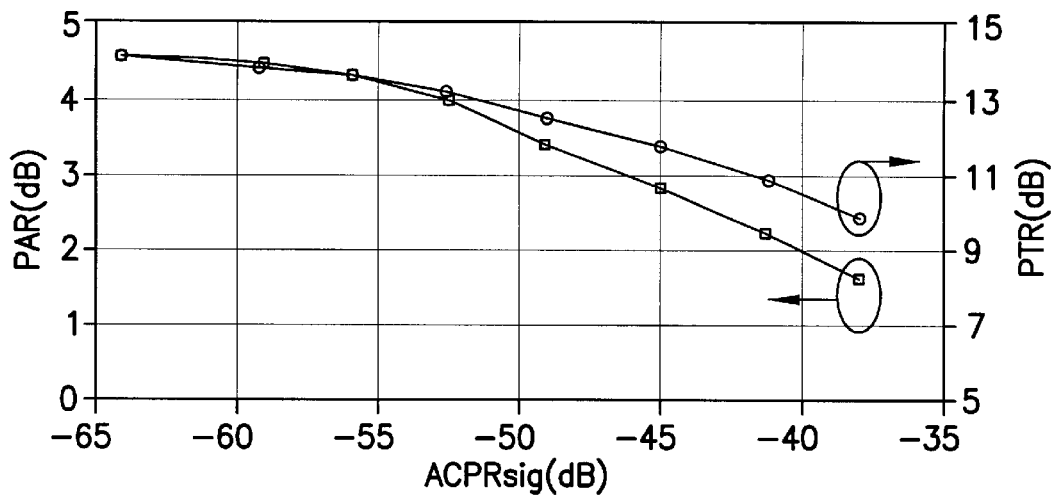
FIG. 11 is a graph showing the relationship of the Peak to Average (power) Ratio (PAR) and the Peak to Trough (power) Ratio (PTR) versus ACPRsig for the embodiments of FIGS. 9 and 10.

An alternative approach, which places less of a processing burden on the DSP 18, is shown in FIG. 10, where Ppk is determined by block 18H as in FIG. 9, while Ptg (trough power, as shown in FIG. 8) is determined by block 18I. The result is the generation of a PTR (peak-to-trough ratio) that is calculated by dividing Ppk by Ptg. PTR is then applied to the tuning table 18E. FIG. 11 shows simulation results that relates ACPRsig to PAR and to PTR.

It can be appreciated that the ACPR of the digital MS 10 transmit signal can be measured in real-time by the methods described above. The measurement can be implemented in the MS 10 using existing hardware, with some addition processing requirements placed on the DSP 18. The use of the ACPR measurement is very useful for optimizing the MS 10 current consumption.

As was explained, the ACPR is an important parameter of a digital MS transmitter. The conventional method to ensure ACPR performance is to build in substantial margins, 5 dB or more. However, this translates into additional DC power consumption. This invention provides a means for the MS 10 to monitor its own ACPR performance so that the margin can be safely reduced, and thus DC power consumption can be reduced.

To estimate the possible savings in power consumption, the following assumptions can be made.

1. The conventional method has an ACPR margin of 5 dB.
2. The ACPR margin is reduced to about 2 dB using the teachings of this invention.
3. Third order nonlinearity is the dominant nonlinearity factor in the transmitter 20.
4. The transmitter circuits operate in class-A mode, and the load line is optimized for a given PA 20' bias current.

The decrease in ACPR margin is thus given by 5−2=3 dB. This translates to a decrease in the linear output power requirement of 3/2=1.5 dB. Since the transmitter circuits are operating in class-A and the load lines are constant, the output power Po and DC current Idc are related by:

$$Po = \frac{1}{2} \times Idc^2 \times R1,$$

where R1 is the load resistance seen by the PA output. Let Po1 and Idc1 be the output power and DC current without the use of the teachings of this invention, and Po2 and Idc2 be the output power and DC current with the use of the teachings of this invention.

$$Po1/Po2 = (Idc1/Idc2)^2.$$

Converting the above equation into dB yields $$10 \log(Po1/Po2) = 20 \log(Idc1/Idc2) = 1.5.$$

$$Idc1/Idc2 = 10^{(1.5/20)} = 1.19$$

$$Idc2/Idc1 = 0.84$$

Hence the DC current (battery current) that is consumed when using the teachings of this invention is 84% of the DC current without the use of the teachings of this invention. The saving is therefore 16%.

While the invention has been particularly shown and described with respect to preferred embodiments thereof, it will be understood by those skilled in the art that changes in form and details may be made therein without departing from the scope and spirit of the invention.

What is claimed is:

1. A method for operating a mobile station, comprising:

operating an RF transmitter power detector to obtain an output signal that is indicative of a magnitude of RF power transmitted by the mobile station;

processing the output signal to determine a time-varying characteristic of the output signal; and determining a value of an Adjacent Channel Power Ratio (ACPR) from the time-varying characteristic;

wherein the time varying characteristic is comprised of output power excursions from an average power level.

2. A method as in claim 1, and further comprising using the determined value of the ACPR to control a DC bias current, and the output power capability, of a transmitter amplifier.

3. A method as in claim 1, wherein processing obtains a ratio of the magnitude of peak power level excursions to the average power level during an interval of time.

4. A method as in claim 1, wherein the output power excursions are comprised of positive and negative output power excursions from the average power level, and wherein processing obtains a ratio of the magnitude of the positive power level excursions to a magnitude of the negative power excursions during an interval of time.

5. A mobile station, comprising:

an RF transmitter power detector coupled to an output of an RF power amplifier for generating an output signal that is indicative of a magnitude of transmitted RF power; and a data processor for processing the output signal to determine a time-varying characteristic of the output signal and for determining a value of an Adjacent Channel Power Ratio (ACPR) from the time-varying characteristic;

wherein the time varying characteristic is comprised of output power excursions from an average power level, and wherein the data processor obtains a ratio of the magnitude of peak power level excursions to the average power level during an interval of time.

6. A mobile station as in claim 5, and further comprising an output power control circuit that is responsive to the determined value of the ACPR to control a DC bias current, and the output power capability, of the RF power amplifier.

7. A mobile station comprising:

an RF transmitter power detector coupled to an output of an RF power amplifier for generating an output signal that is indicative of a magnitude of transmitted RF power; and a data processor for processing the output signal to determine a time-varying characteristic of the output signal and for determining a value of an Adjacent Channel Power Ratio (ACPR) from the time-varying characteristic, wherein the time varying characteristic is comprised of positive and negative output power excursions from an average power level, and wherein the data processor obtains a ratio of the magnitude of the positive power level excursions to a magnitude of the negative power excursions during an interval of time.

8. A mobile station as in claim 7, further comprising an output power control circuit that is responsive to the determined value of the ACPR to control a DC bias current, and the output power capability, of the RF power amplifier.

* * * * *